US010549740B2

(12) United States Patent
Schnittger et al.

(10) Patent No.: US 10,549,740 B2
(45) Date of Patent: Feb. 4, 2020

(54) PRESSURE-LIMITING VALVE

(71) Applicant: KNORR-BREMSE Systeme fuer Nutzfahrzeuge GmbH, Munich (DE)

(72) Inventors: Karsten Schnittger, Munich (DE); Fabian Prinsen, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 15/971,299

(22) Filed: May 4, 2018

(65) Prior Publication Data
US 2018/0251110 A1 Sep. 6, 2018

Related U.S. Application Data

(63) Continuation of application No. PCT/EP2016/076406, filed on Nov. 2, 2016.

(30) Foreign Application Priority Data

Nov. 5, 2015 (DE) .......................... 10 2015 118 963

(51) Int. Cl.
*B60T 11/34* (2006.01)
*B60T 15/50* (2006.01)
(Continued)

(52) U.S. Cl.
CPC ............... *B60T 11/34* (2013.01); *B60T 15/50* (2013.01); *B60T 17/18* (2013.01); *F16K 17/048* (2013.01);
(Continued)

(58) Field of Classification Search
CPC .......... B60T 11/34; B60T 15/50; B60T 17/18; B60T 17/048; B60T 17/06; F16K 17/048; F16K 17/06; Y10T 137/7801
(Continued)

(56) References Cited

U.S. PATENT DOCUMENTS 3,400,735 A * 9/1968 Favors .................. F16K 15/202
137/495
4,305,423 A * 12/1981 Adler ...................... F16K 15/00
137/454.6
(Continued)

FOREIGN PATENT DOCUMENTS

CN 201992150 U 9/2011
DE 1 775 580 A 8/1971
(Continued)

OTHER PUBLICATIONS

German-language Office Action issued in counterpart German Application No. 10 2015 118 963.1 dated Jun. 29, 2016 (five pages).
(Continued)

Primary Examiner — William M McCalister
(74) Attorney, Agent, or Firm — Crowell & Moring LLP

(57) ABSTRACT

A pressure-limiting valve includes a housing having a piston, a pressure-limiting adjusting spring, at least one inlet and at least one outlet. The piston can assume an open position in which the inlet and the outlet are connected to each other, and at least one closed position in which the inlet and the outlet are separated from each other. The piston has a first piston ring with a sealing surface and a second piston ring. In the closed position, the sealing surface is drawn against a housing projection in a sealing manner by a pneumatic force which acts on the second piston ring and is directed against the force of the pressure-limiting adjusting spring. A pneumatic passage in the piston which implements a safety valve function can be sealed by a spring-loaded safety valve body arranged on a side of the second piston ring that is opposite the outlet.

7 Claims, 3 Drawing Sheets

(51) Int. Cl.
  *F16K 17/04* (2006.01)
  *F16K 17/06* (2006.01)
  *B60T 17/18* (2006.01)

(52) U.S. Cl.
  CPC ......... *F16K 17/06* (2013.01); *Y10T 137/7801* (2015.04)

(58) Field of Classification Search
  USPC .................................................... 137/505.18
  See application file for complete search history.

(56) References Cited

U.S. PATENT DOCUMENTS

| | | | | |
|---|---|---|---|---|
| 9,016,317 | B2 * | 4/2015 | Myrhum, Jr. ........... | F16K 15/18 137/522 |
| 2001/0025656 | A1 * | 10/2001 | Hiddessen ........... | G05D 16/107 137/505.18 |
| 2008/0257421 | A1 * | 10/2008 | Kranz ..................... | F16K 17/32 137/461 |
| 2014/0090717 | A1 * | 4/2014 | Mevius ................. | G05D 16/10 137/12 |

FOREIGN PATENT DOCUMENTS

| | | | |
|---|---|---|---|
| DE | 26 19 769 A1 | 11/1977 | |
| DE | 26 20 135 A1 | 11/1977 | |
| DE | 30 26 283 A1 | 2/1982 | |
| DE | 33 11 816 C1 | 7/1984 | |
| DE | 40 12 576 A1 | 10/1991 | |
| DE | 41 14 977 A1 | 11/1992 | |
| DE | 42 16 247 A1 | 11/1993 | |
| DE | 600 24 496 T2 | 8/2006 | |
| DE | 20 2006 017 517 U1 | 5/2007 | |
| DE | 10 2006 033 429 A1 | 1/2008 | |
| DE | 10 2008 053 994 A1 | 5/2010 | |
| DE | 10 2008 063 819 A1 | 7/2010 | |
| GB | 969901 A | 9/1964 | |
| GB | 1 278 305 | 6/1972 | |
| GB | 2137320 A * | 10/1984 | ............. B60T 11/34 |
| GB | 2 243 671 A | 11/1991 | |
| RU | 2 137 175 C1 | 9/1999 | |
| RU | 2 509 016 C2 | 3/2014 | |
| WO | WO 01/13017 A2 | 2/2001 | |

OTHER PUBLICATIONS

International Preliminary Report on Patentability (PCT/IB/373) issued in PCT Application No. PCT/EP2016/076406 dated May 8, 2018, including English translation of document C2 (German-language Written Opinion (PCT/ISA/237)) previously filed on May 8, 2018 (seven pages).
Russian-language Office Action issued in counterpart Russian Application No. 2018120502/11(032330) dated Feb. 8, 2019 with partial English translation (13 pages).
International Search Report (PCT/ISA/210) issued in PCT Application No. PCT/EP2016/076406 dated Feb. 17, 2017 with English translation (seven pages).
German-language Written Opinion (PCT/ISA/237) issued in PCT Application No. PCT/EP2016/076406 dated Feb. 17, 2017 (five pages).

* cited by examiner

PRESSURE-LIMITING VALVE

CROSS REFERENCE TO RELATED APPLICATIONS

This application is a continuation of PCT International Application No. PCT/EP2016/076406, filed Nov. 2, 2016, which claims priority under 35 U.S.C. § 119 from German Patent Application No. 10 2015 118 963.1, filed Nov. 5, 2015, the entire disclosures of which are herein expressly incorporated by reference.

BACKGROUND AND SUMMARY OF THE INVENTION

The present invention relates to a pressure-limiting valve comprising a valve housing, a valve piston with a pressure-limiting spring, wherein the pressure-limiting valve is, in particular, a pressure-limiting valve of an air treatment system for a brake system for a utility vehicle.

Air treatment systems for pneumatic brake systems, in which a safety valve for a reduced-pressure circuit for a pressure limiter is integrated, are known in connection with utility vehicles.

The air treatment arrangement is a central component in a pneumatic brake system of a utility vehicle, in which air treatment arrangement the oil- and water-containing air which is delivered by the compressor is filtered and cleaned. The compressed air is allocated, at the required pressure and in the correct filling order, to the various brake circuits and air consumers in the utility vehicle. In the event of a defect, the individual brake circuits are secured in relation to one another, so that an adequate auxiliary braking effect is available for braking the utility vehicle (for example a heavy goods vehicle). An electronic air treatment arrangement contains, in addition to a control electronics system, sensors and actuators. The most recent air treatment devices additionally also contain an electronic parking brake (EPB).

In this case, some of these brake circuits operate at a relatively low pressure level which lies below the pressure level of the other brake circuits.

In this case, the pressure can be reduced to the desired low level using a pressure-limiting valve. Since the force of the spring of the pressure limiter is adjusted using an adjusting screw, the desired pressure level adjusted.

Different designs are known for pressure-limiting valves of this kind. The prior art discloses, in particular, pressure-limiting valves according to the "pushing shut" principle, in which, in the event of an increase in pressure in the system, the pressure limiter closes at the defined closing pressure and thereby limits the outlet-side pressure. In the event of a further increase in pressure on the inlet side of the pressure limiter, said pressure limiter is pushed shut by means of an active face on the valve and the sealing force at the valve seat increases. A pressure-limiting valve of this kind is known, for example, from DE 10 2010 947 491 A1.

Further pressure-limiting valves are known from DE 33 11 816 C1, DE 26 20 135 A1, DE 41 14 977 A1, DE 30 26 283 A1, DE 26 19 769 A1, DE 26 19 769 A1, DE 600 24 496 D2 and DE 20 2006 017 517 U1, wherein these valves likewise operate in accordance with the "pushing shut" principle.

A further principle for pressure-limiting valves is the "pulling shut" principle, wherein, in the event of an increase in pressure in the system, the pressure limiter closes at a defined closing pressure and thereby limits the outlet-side pressure. In the event of a further increase in pressure on the inlet side of the pressure limiter, an active face on the piston generates a force which is introduced into the valve seat as tensile force by the piston. The sealing force at the valve seat is increased as a result.

DE 43 44 416 A1 discloses a pressure-limiting device which operates in accordance with the "pulling shut" principle. However, this pressure-limiting valve does not have a safety valve function.

The object of the present invention is to advantageously develop a pressure-limiting valve of the kind outlined in the introductory part, in particular to the effect that it can be constructed with a lower installation space requirement and also with fewer components.

According to the invention, a pressure-limiting valve includes a valve housing, a valve piston and a pressure-limiting adjusting spring, wherein at least one valve inlet and at least one valve outlet are provided in the valve housing, wherein the valve piston can assume an open position, in which the valve inlet and the valve outlet are connected to one another, and at least one closed position, in which the valve inlet and the valve outlet are separated from one another, wherein the valve piston has a first piston ring with a sealing face and has a second piston ring, wherein, in the closed position, the sealing face of the first piston ring is pulled against a housing lip by a pneumatic force which acts on the second piston ring and which is directed against the force of the pressure-limiting adjusting spring, and wherein, furthermore, there is a pneumatic passage in the valve piston for the purpose of creating a safety valve function, as a result a spring-loaded safety valve body which is arranged on that side of the second piston ring which is opposite the valve outlet can be closed.

The invention is based on the basic idea that a safety valve function is integrated in the pressure-limiting valve. Owing to the integration of a safety valve function in the pressure-limiting valve, the pressure-limiting valve can be constructed in a more simple manner overall and as a result parts of the pressure-limiting valve and of the safety valve can be dispensed with. The pressure-limiting valve according to the invention is a pressure-limiting valve in accordance with the "pulling shut" principle which allows a self-reinforcing effect when a predefined closing pressure is exceeded. In the event of an increase in pressure in the system, the pressure limiter closes at the defined closing pressure and thereby limits the outlet-side pressure point. In the event of a further increase in pressure on the inlet side of the pressure limiter, an active face on the piston generates a force which is introduced into the valve seat as tensile force by the piston. As a result, the sealing force on the valve seat is increased and therefore has a self-reinforcing effect. Owing to the integration of the safety valve function, pressure from the pressure-limited circuits can be kept below a maximum defined permissible pressure in the event of a fault. If this pressure is exceeded, the spring-loaded safety valve body which is arranged in the pressure-limiting valve can open and release pressure in this way. The safety valve function is formed in this way.

Integrating the safety valve function in the pressure-limiting valve has the advantage that there is a lower installation space requirement since the safety valve is accommodated in the installation space of the pressure limiter.

Furthermore, it can be provided that the safety valve body is spring-loaded by the pressure-limiting adjusting spring. In this way, it is possible that a separate spring for the safety valve body is not required for forming the safety valve function by means of the safety valve body. As a result, some components can be saved, in particular the spring and also the adjusting screw of the safety valve. Costs can be saved in this way.

In addition, it is possible that the safety valve body has a guide which, in a closure position, is guided in a recess of the second piston ring. Guiding the safety valve body in a recess of the second piston ring can have the effect that the safety valve body performs a defined movement relative to the second piston ring and therefore to the valve piston. A robust design and a defined ability to adjust the closing characteristics are possible as a result.

Furthermore, it can be provided that the safety valve body bears on the second valve seat by way of a sealing face, and in this way closes the pneumatic passage in a sealing manner, at least in the closed position. As a result, a simple and small design of the pressure-limiting valve with the integrated safety valve function is possible and facilitated.

Furthermore, it can be provided that the limit pressure, at which the pressure-limiting valve switches to the closed position, can be adjusted by the pressure-limiting adjusting spring and an adjusting element. In particular, it is conceivable that the adjusting element is an adjusting screw. This allows simple and robust adjustment of the switching characteristics of the pressure-limiting valve.

In particular, it can be provided that the prestress of the pressure-limiting adjusting spring can be adjusted by the adjusting element.

Furthermore, it can be provided that the limit pressure, at which the safety valve body releases the pneumatic pressure, can be adjusted by the pressure-limiting adjusting spring and an adjusting element. The adjusting element may be the adjusting element of the pressure-limiting valve or the adjusting screw of the pressure-limiting adjusting spring for adjusting the prestress of the pressure-limiting adjusting spring.

Furthermore, it can be provided that the pneumatic passage is formed by a passage bore through the valve piston.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
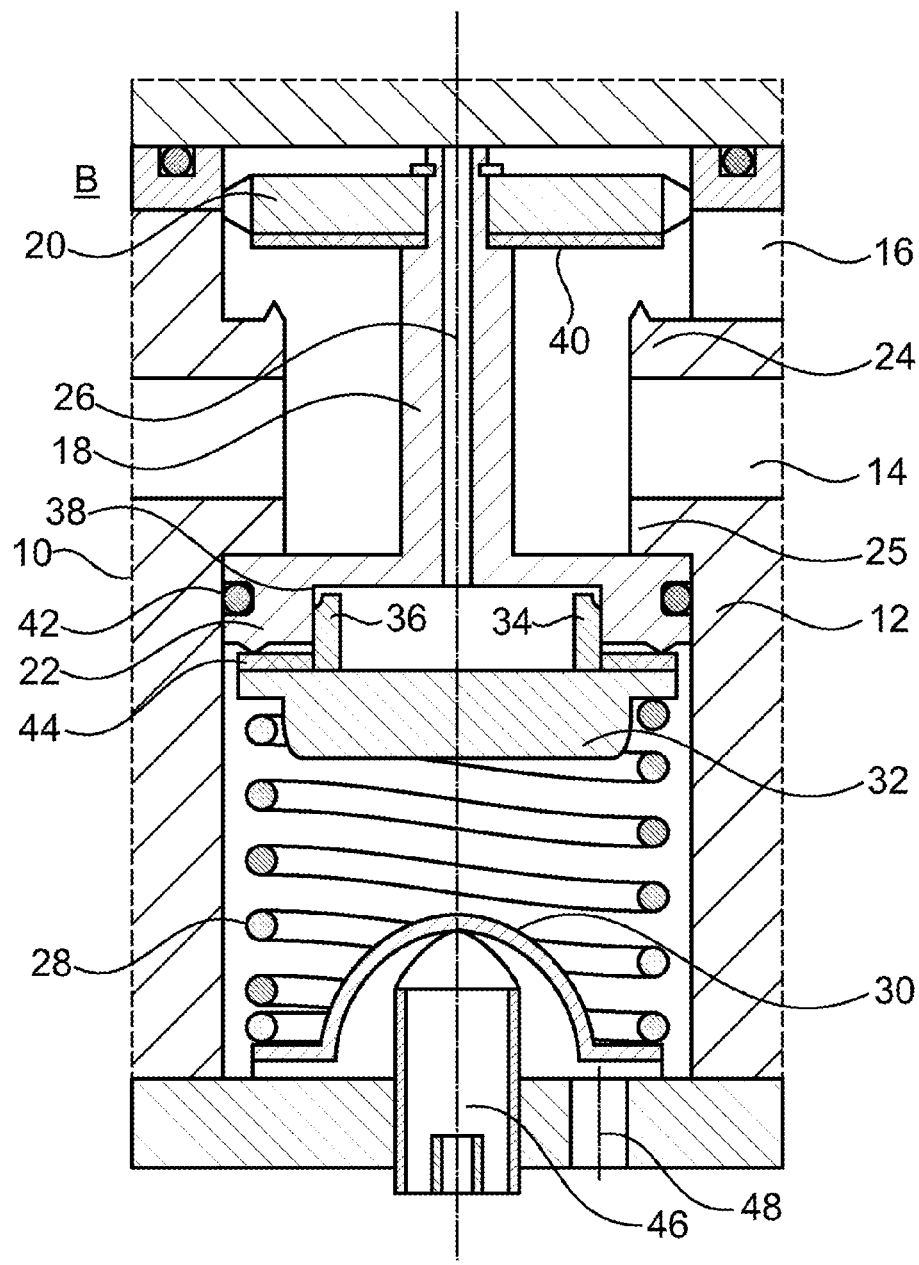
FIG. 1 shows a schematic sectional drawing of an embodiment according to the invention of a pressure-limiting valve.

FIG. 1 shows a schematic sectional illustration of an embodiment according to the invention of a pressure-limiting valve 10 which operates in accordance with the "pulling shut" principle and is equipped with a safety valve function.

The pressure valve 10 is shown in the filling position B.

The pressure-limiting valve 10 has a valve housing 12 comprising a valve inlet 14 and a valve outlet 16.

A valve piston 18, which has a first piston ring 20 and a second piston ring 22, is inserted into the valve housing 12.

The valve housing 12 has, in the interior, a housing lip 24 around the valve inlet 14, said housing lip being provided for the first piston ring 20 to stop against.

As in the embodiment shown in FIG. 1 illustrated operating phase of filling with compressed air from the inlet to the outlet, the second piston ring 22 is stopped against a second housing lip 25.

The valve piston 18 has a pneumatic passage 26 which is formed by a passage bore through the valve piston.

The passage bore is coaxial with the axis of the valve piston 18.

A pressure-limiting adjusting spring 28 acts indirectly on the valve piston 18, spring-loading the valve piston 18 using its spring force directed in such a way that it does not make contact with the first housing lip 24 until a limit pressure of the first piston ring 20 is reached.

The pressure-limiting adjusting spring 28 is seated at one of its ends on a force-introducing cap 30 and at its other end on the safety valve body 32. The safety valve body 32 is therefore spring-loaded by the pressure-limiting adjusting spring 28.

The safety valve body 32 itself is guided in a guide 34 of the second piston ring 22 and is seated on the second piston ring in the position shown in FIG. 1.

The guide 34 has a through-passage 36 through which, for example, compressed air can pass.

Figure 2:
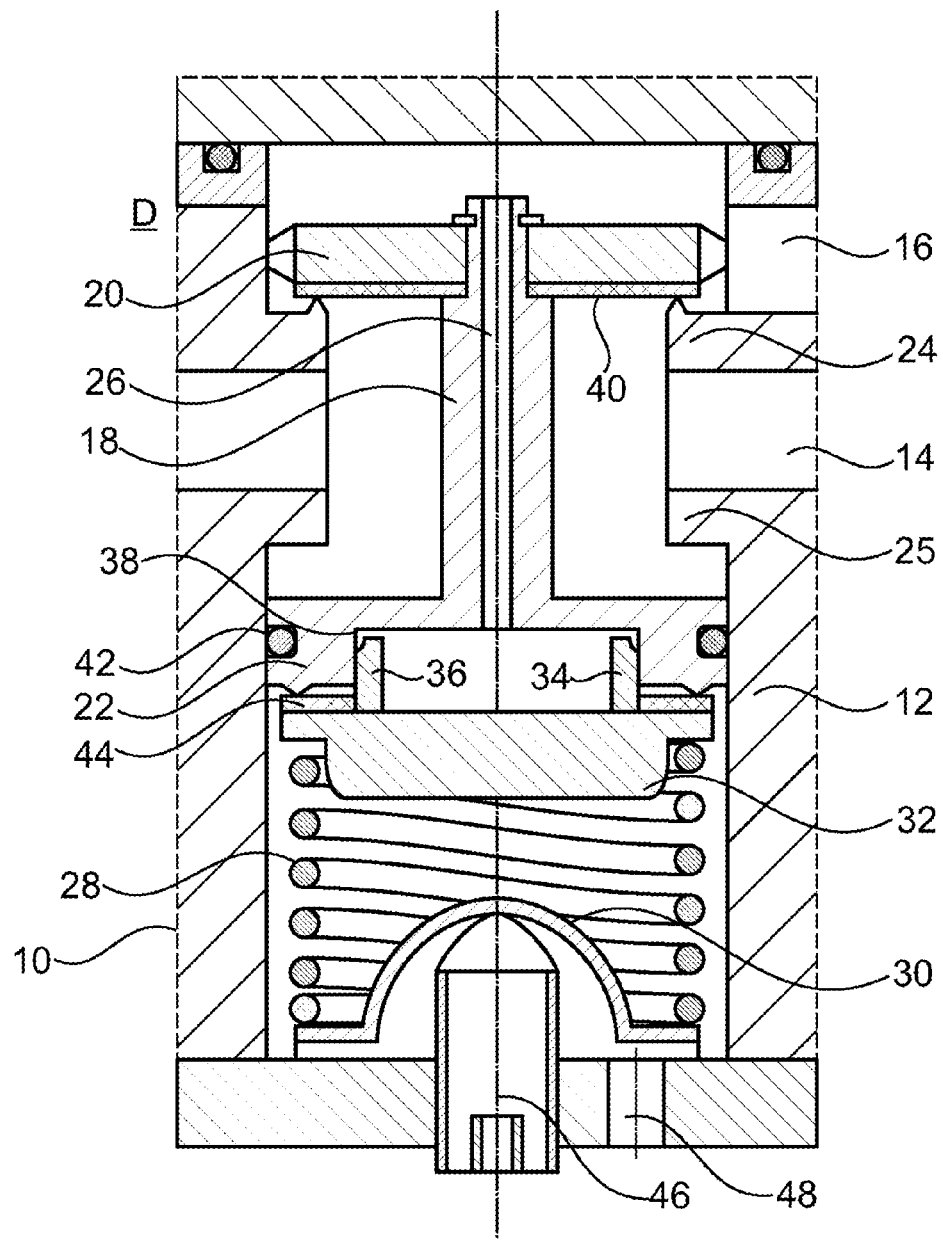
FIG. 2 shows a further sectional illustration of the pressure-limiting valve according to FIG. 1 in the closed position or during the pressure-limiting operation.

In the position in FIG. 1 and FIG. 2, the guide 34 is guided in the recess 38 of the second piston ring 22.

The first piston ring 20 has a sealing face 40 on an axially oriented face which faces the second piston ring 22.

The second piston ring 22 in turn has a sealing ring 42 in its circumferential face, that is to say in a radially oriented manner. The safety valve body 32 in turn likewise has a safety valve body sealing face 44 on an axially oriented face which faces the second piston ring 22.

The sealing face 40, the sealing ring 42 and the safety valve body sealing face 44 can be formed, for example, by vulcanized-on seals.

However, in principle, it is also conceivable that these seals are rubber seals which are pulled onto the valve piston 18. It is also conceivable that the sealing ring 42 is designed as an O-ring.

Furthermore, the pressure-limiting valve 10 has an adjusting element 46 which is depicted as an adjusting screw 46 here.

Furthermore, a safety valve outlet 48, via which venting can be performed, is also provided in the region of the adjusting element 46.

The functioning of the pressure-limiting valve 10 can be described as follows:

In the filling position B, shown in FIG. 1, of an empty system or a system which is subject to low pressure, the second piston ring 22 is pushed against the housing lip 25, specifically owing to the spring force of the pressure-limiting adjusting spring 28 and also owing to the applied pneumatic pressure of the compressed air flowing in via the valve inlet 14 and acting against the pneumatically active face of the first piston ring 20. As a result, compressed air can flow via the valve inlet 14 to the valve outlet 16. During the filling of an empty system, the valve piston 18 remains in position B until the valve piston begins to move starting from a certain pressure. The piston ring 20 then approaches the housing lip 24.

The pressure at which the valve sets closes determines the limit pressure of the pressure-limiting valve 10. This is also the design point of the pressure-limiting valve and is adjusted using the corresponding adjusting element 46.

FIG. 2 shows the pressure-limiting position D which is also a closed position.

The valve inlet 14 and the valve outlet 16 are pneumatically separated from one another in the closed position.

In the closed position, the sealing face 40 of the first piston ring 20 is pulled in a sealing manner against the housing lip 24, specifically by a pneumatic force which is generated compressed air flowing in via the valve inlet 14. In the process, the pneumatically active faces on the first piston ring 20 and second piston ring 22 generate a force which overcomes the force of the pressure-limiting adjusting spring 28.

The limit pressure, at which the pressure-limiting valve 10 moves from the filling position B to the pressure-limiting position D, can be made by the adjusting screw 46. The limit pressure, at which the pressure-limiting valve 10 reaches the pressure-limiting position D, can be adjusted by correspondingly prestressing the pressure-limiting adjusting spring 28 by the adjusting screw 46 which acts on the force-introducing cap 30 and sets said force-introducing cap against the pressure-limiting adjusting spring 28 or relieves said force-introducing cap of stress, depending on the desired prestress. The limit pressure at which the safety valve body 32 opens the pneumatic passage 26 and realizes the safety function against overpressure in the entire system can also be adjusted in this way.

The pressure-limiting adjusting spring 28 presses the safety valve body 32 against the second piston ring 22, specifically in such a way that the safety valve body sealing face 44 bears against the second piston ring 22. As a result, the pneumatic passage 26 is also sealed off or closed in a sealing manner at the same time.

The pressure-limiting valve 10 therefore closes at a defined closing pressure and therefore limits the outlet-side pressure to this value.

In the event of a further increase in pressure on the inlet side of the pressure-limiting valve 10, an active face on the valve piston 18 generates a force which is introduced into the valve seat as tensile force by the valve piston 18. The sealing force on the valve seat is increased as a result.

Figure 3:
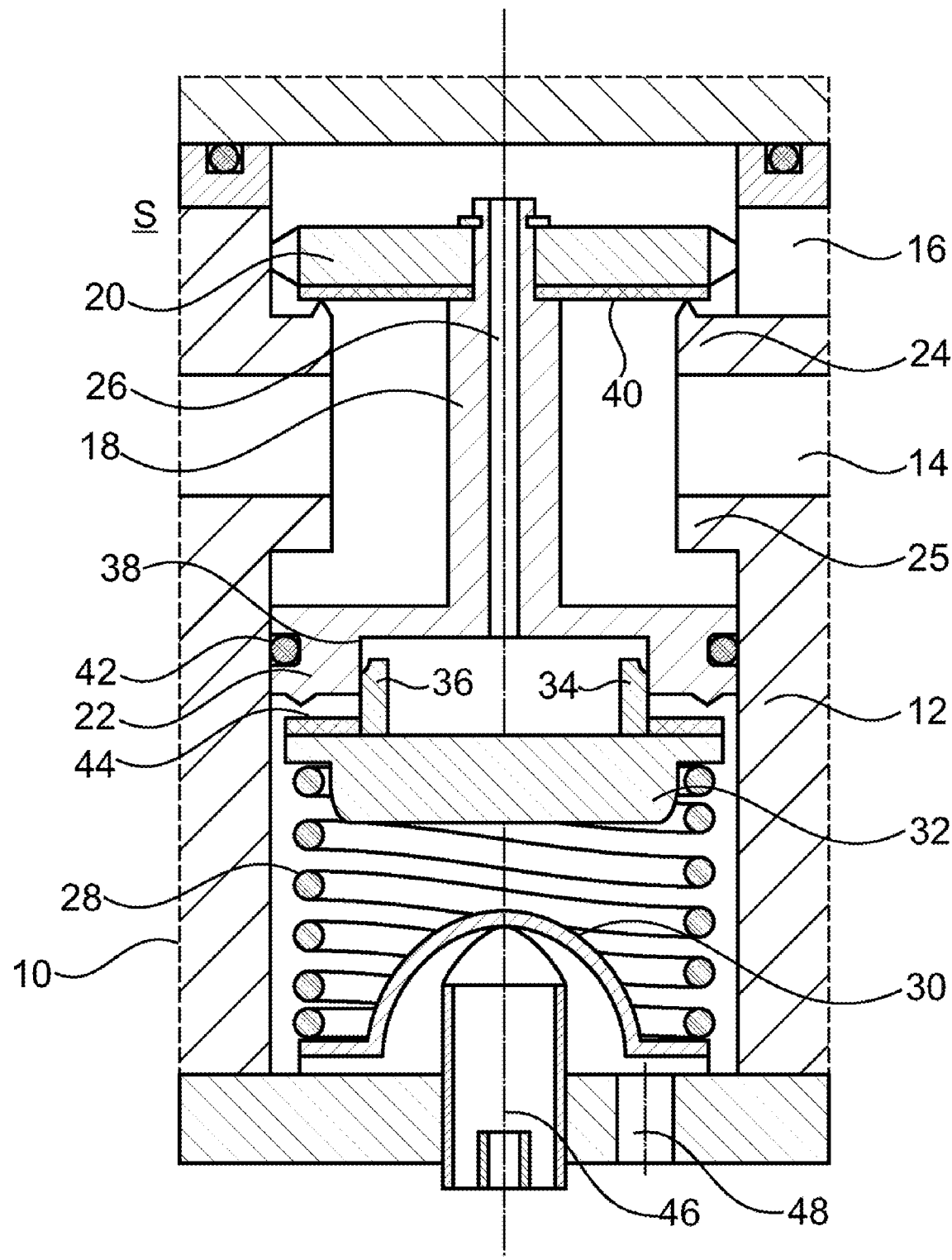
FIG. 3 shows a further sectional illustration of the pressure-limiting valve according to FIG. 1 in the event of a fault with the safety valve open.

If, as shown in FIG. 3, the pressure on the outlet side increases further in the event of a fault, this pressure can push up via the central bore, that is to say the pneumatic passage 26 in the valve piston 18 of the integrated safety valve.

The integrated safety valve likewise uses the pressure-limiting adjusting spring and the adjusting screw 46 of the pressure-limiting valve 10. In the position shown in FIG. 3, the pressure-limiting valve is in the safety valve opening position S.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

10 Pressure-limiting valve
12 Valve housing
14 Valve inlet
16 Valve outlet
18 Valve piston
20 First piston ring
22 Second piston ring
24 Housing lip
25 Second housing lip
26 Pneumatic passage
28 Pressure-limiting adjusting spring
30 Force-introducing cap
32 Safety valve body
34 Guide
36 Through-passage
38 Recess
40 Sealing face
42 Sealing ring
44 Safety valve body sealing face
46 Adjusting element; adjusting screw
48 Safety valve outlet
B Filling position
D Pressure-limiting position
S Safety valve opening position

What is claimed is:

1. A pressure-limiting valve, comprising:
   a valve housing having at least one valve inlet and at least one valve outlet;
   a valve piston;
   a pressure-limiting adjusting spring; and
   a spring-loaded safety valve body,
   wherein
      the valve housing and valve piston are configured such that the valve piston is movable into an open position in which the valve inlet and the valve outlet are fluidly connected to one another, and movable into at least one closed position in which the valve inlet and the valve outlet are separated from one another,
      the valve piston has a first piston ring with a sealing face and a second piston ring,
      in the closed position the sealing face of the first piston ring is pulled in a sealing manner against a housing lip by a pneumatic force acting on the first piston ring and second piston ring against a force of the pressure-limiting adjusting spring,
      the valve piston includes a pneumatic passage closable by the spring-loaded safety valve body, the safety valve body being arranged on a side of the second piston ring opposite the at least one valve outlet, and
      the safety valve body has a sealing face configured to bear on a second valve seat on the second piston ring and close the pneumatic passage when the safety valve body is in a closed position.

2. The pressure-limiting valve as claimed in claim 1, wherein
   the safety valve body is spring-loaded by the pressure-limiting adjusting spring.

3. The pressure-limiting valve as claimed in claim 2, wherein
   the safety valve body has a guide configured such that when the safety valve body is in a closed position, the guide is guided in a recess of the second piston ring.

4. The pressure-limiting valve as claimed in claim 1, wherein
   a limit pressure at which the pressure-limiting valve switches to the closed position is adjustable by the pressure-limiting adjusting spring and an adjusting element.

5. The pressure-limiting valve as claimed in claim 4, wherein
   a prestress of the pressure-limiting adjusting spring is adjustable by the adjusting element.

6. The pressure-limiting valve as claimed in claim 5, wherein the limit pressure at which the safety valve body opens the pneumatic passage is adjustable by the pressure-limiting adjusting spring and the adjusting element.

7. The pressure-limiting valve as claimed in claim 1, wherein the pneumatic passage is a passage bore through the valve piston.

\* \* \* \* \*